United States Patent
Kim et al.

(10) Patent No.: US 8,252,856 B2
(45) Date of Patent: Aug. 28, 2012

(54) WHITE FILM AND A METHOD OF MANUFACTURING OPAQUE WHITE FILM

(75) Inventors: Do Hyun Kim, Daegu (KR); Gi Sang Song, Gumi-si (KR); Sung Jun Cho, Gumi-si (KR)

(73) Assignee: Kolon Industries, Inc., Gwacheon-si (KR)

( * ) Notice: Subject to any disclaimer, the term of this patent is extended or adjusted under 35 U.S.C. 154(b) by 0 days.

(21) Appl. No.: 12/893,736

(22) Filed: Sep. 29, 2010

(65) Prior Publication Data

US 2011/0077339 A1    Mar. 31, 2011

(30) Foreign Application Priority Data

Sep. 30, 2009   (KR) .................. 10-2009-0093186

(51) Int. Cl.
*C08J 3/22*   (2006.01)
(52) U.S. Cl. ........................................ 523/351; 524/423
(58) Field of Classification Search ............... 523/351; 524/423

See application file for complete search history.

(56) References Cited

FOREIGN PATENT DOCUMENTS

WO   WO 2009/125701   * 10/2009

* cited by examiner

*Primary Examiner* — Peter Szekely
(74) *Attorney, Agent, or Firm* — Sughrue Mion, PLLC

(57) ABSTRACT

Disclosed is a white film having low content of oligomer within the film.

10 Claims, No Drawings

WHITE FILM AND A METHOD OF MANUFACTURING OPAQUE WHITE FILM

CROSS REFERENCE TO RELATED APPLICATION

This application is claiming priority based on Korean Patent Application No. 10-2009-0093186 filed Sep. 30, 2009, the contents of all of which are incorporated herein by reference in their entirety.

TECHNICAL FIELD

The present invention relates to a method of manufacturing opaque white film, and more particularly to a white film having excellent opacity and low content of oligomer extraction, and can be widely used for a billboard, a banner, a label, a package for food, a package for beverage, and the line, as well as a industrial laminate, insulation, a backsheet for solar cell.

BACKGROUND ART

Currently, a paper, a white plastic film, etc. are generally used as a substrate of a label, a leaflet, a card, a calendar, and the like, and polyvinylchloride, polyolefin, polystyrene, and the like are used as plastics.

Generally, a polyolefin film containing inorganic fine particle has been frequently used as a substrate for paper substitute, however the polyolefin film has poor mechanical strength, poor heat resistance, poor weather resistance and poor dimensional stability, so its uses are limited. These days, a polyester film is increasingly used for several use of a paper substitute.

The white film has been used for label, graphic, and the like that considers a concealment or printing as important, however recently, their uses are expanding to all sorts of packaging food (yogurt cap, etc.), industrial insulation, solar cell, backsheet. For this reason, there is the problem that the oligomer in the film is extracted by the migration phenomenon when increasing the temperature of film.

DISCLOSURE

Technical Problem

An object of the present invention is to provide white film that has excellent concealment and whiteness, low content of oligomer extracted in a final film, and a good operability without breakdown of film by the optimization of the pore's occur when manufacturing film.

The present invention further provides a white film being suitable for a packaging food and beverage, all sorts of industrial insulation, solar cell back sheet, and the like.

Technical Solution

To achieve the object of the present invention, the present invention provides a method for manufacturing white film having low content of oligomer in polyester resin by including the solid-phase polymerization.

Concretely, the present invention provides a method for manufacturing white plastic film comprising:

providing a first particulate polyester material and second particulate polyester material;

subjecting said first particulate polyester material to solid state polymerization to prepare a first polyester resin having the intrinsic viscosity of 0.65~0.90 and the oligomer content of less than 0.5%;

providing a master batch composition including the second particulate polyester material −5[ ]-25 parts by weight of an amorphous polyester resin and 50 [ ] 150 parts by weight of barium sulfate, each based on 100 parts by weight of the second particulate polyester material;

subjecting the master batch composition to solid state polymerization to prepare a second polyester resin having an oligomer content of less than 0.5% within the second polyester resin, and a melt viscosity of 500 [ ]-3,000 Poise in the full range of shear rate 100[ ]-5,000 l/s after melting at 280° C. for 5 minutes;

preparing a mixture of the first polyester resin and the second polyester resin;

subjecting the mixture to melt-extrusion to prepare a sheet;

drawing the sheet to produce a film;

heat-treating the drawn film; and heat-setting the heat-treated film to provide the white plastic film.

As the amorphous polyester resin, the resin being prepared by copolymerizing components selected from the group consisting of the acid component selected from the group consisting of isophthalic acid, oxyethoxy benzoic acid, adipic acid, sebacic acid, 5-sodiumsulfoisophtalic acid, the ester-forming derivative thereof, and the mixture thereof; the diol component selected from the group consisting of propyleneglycol, trimethyleneglycol, 1,4-cyclohexandiol, 1,4-cyclohexanedimethanol, 1,4-bixoxyethoxybenzene, bisphenol, polyoxyethyleneglycol, neopentylglycl, and the mixture thereof; and the mixture thereof in the amount of 10~20 mole % in the polyethyleneterephtalate structure that is prepared by the polymerization of terephtalic acid and ethyleneglycol, is used.

In the preparing of the masterbatch, the masterbatch includes 50~150 parts by weight of barium sulfate based on the 100 parts by weight of amorphous polyester resin.

In the mixing of the polyester resin with the masterbatch and then the extruding of it after the melt-mixing, the sheet includes 10~100 parts by weight of masterbatch based on the 100 parts by weight of polyester resin.

The polyester resin is polyethyleneterephtalate.

In addition, the present invention includes the white film being prepared with the above-mentioned method, and the white film has less than of 0.8% of oligomer content in the final film, and crystallization speech of 20-180 seconds being measured under the isothermal condition of 210° C. after melting at 280° C. for 5 minutes by using DSC.

Hereinafter, the embodiments of the present invention will be described in detail.

The term of an oligomer in the present invention refers to the low molecular weight having the degree of polymerization of 2~10, and includes cyclic oligomer being produced by the cyclization reaction between both ends of the molecular as the principle component.

The polyester resin in the a) stage is a generic term for polymer that the covalent-bonding of monomer residue combining with monomer residue that is the principal bonding of the backbone, is composed of the ester bonding, and generally, is obtained by the condensation polymerization of dicarboxylic acid compound and dihydroxy compound, or dicarboxylic acid ester derivative and dihydroxy compound.

Examples of the dicarboxylic acid compound include aromatic dicarboxylic acid such as terephtalic acid, 2,6-naphtalenecarboxylic acid, isophtalic acid, diphenylcarboxylic acid, diphenylsulfondicarboxylic acid, diphenoxyethandicarboxylic acid, 5-sodiumsulfoisophtalic acid, phtalic acid, and the like, aliphatic dicarboxylic acid such as oxalic acid, succinic acid, adipic acid, sebacic acid, dimer acid, maleic acid, fumaric acid, and the like, alicyclic dicarboxylic acid such as cyclohexanedicarboxylic acid, oxycarboxylic acid such as paraoxybenzoic acid, and the like.

In addition, examples of the dicarboxylic acid ester derivative include esters of the dicarboxylic acid compound, for example terephtalic acid dimethyl, terephtalic acid diethyl, terephtalic acid 2-hydroxyethylmethylester, 2,6-naphtalenedicarboxylic acid dimethyl, isophtalic acid dimethyl, adipic acid dimethyl, maleic acid dimethyl, dimer acid dimethyl, and the like.

Examples of the hydroxy compound include aliphatic hydroxy compound such as ethyleneglycol, 1,2-propanediol, 1,3-propanediol, 1,3-butanediol, 1,4-butanediol, 1,5-pentanediol, 1,6-hexanediol, neopentylglycol, and the like, polyoxyalkyleneglycol such as diethyleneglycol, polyethyleneglycol, polypropyleneglycol, polytetramethyleneglycol, and the like, alicyclic dihydroxy compound such as 1,4-cyclohexanedimethanol, aromatic dihydroxy compound such as bisphenol A, bisphenol S, and the like.

Among them, terephtalic acid, 2,6-naphtalenedicarboxylic acid, isophtalic acid, and the like may be preferably used as dicarboxylic acid compound, and neopentylglycol, ethyleneglycol, 1,3-propanediol, 1,4-butanediol, polytetramethyleneglycol, 1,4-cyclohexanedimethanol and the like may be preferably used as dihydroxy compound.

Among them, particularly, it is preferable to use polyethylene terephtalate (PET) composed of terephtalic acid dimethyl and ethyleneglycol.

In addition, after solid phase polymerization, the intrinsic viscosity is preferably 0.65~0.90. The intrinsic viscosity of the polyester resin influences the processability of film and the physical property of film. In case of less than 0.65 of intrinsic viscosity, it is impossible to sufficiently increase enough to satisfy the strength of the film when processing, it is pyrolized during the melt-extrusion when processing the film, and occur the breakdown phenomenon after manufacturing film, to decrease the productivity and be brittle the film. In addition, the production of oligomer is increased, so that the pollution inside a tenter as well as the use of film is limited. In case of greater than 0.90 of intrinsic viscosity, the melt viscosity is very increased, so the productivity in the after-process may be largely decreased due to the difficulty of extruding process by the increase of the extrusion pressure.

In addition, after solid phase polymerization, the polyester resin has the content of oligomer in the resin of less than 0.5% by weight, more preferably 0.1~0.4% by weight. In case of having the oligomer content of above range, there is few of the migration occur of oligomer, and it is possible to provide the polyester resin having excellent waterproofness.

In order to prepare the polyester resin having the above-mentioned physical property, the content of end group may be controlled by using the end group capping agent at the polycondensation step when synthesizing polyester resin, and the content of oligomer may be controlled by adding the solid phase polymerization step.

In the b) stage, the masterbatch is prepared by melt-mixing 5~25 parts by weight of amorphous polyester resin and 50~150 parts by weight of barium sulfate, based on 100 parts by weight of polyester resin, and then the masterbatch, in which oligomer content in the polyester resin is less than 0.5%, and the melt viscosity in the full range of Shear Rate 100~5,000 l/s after melting for 5 minutes at 280° C. is 500~3,000 Poise, is prepared by solid phase polymerizing after preparing the above masterbatch.

The polyester resin being used in the masterbatch is a generic term for polymer, in which the covalent-bonding for bonding monomer residue and monomer residue that is the principal bonding of the backbone is composed of the ester bonding, and generally, may be obtained by the condensation polymerization of dicarboxylic acid compound and dihydroxy compound, or dicarboxylic acid ester derivative and dihydroxy compound. Examples of the dicarboxylic acid compound include aromatic dicarboxylic acid such as terephtalic acid, 2,6-naphtalenecarboxylic acid, isophtalic acid, diphenylcarboxylic acid, diphenylsulfondicarboxylic acid, diphenoxyethandicarboxylic acid, 5-sodiumsulfoisophtalic acid, phtalic acid, and the like, aliphatic dicarboxylic acid such as oxalic acid, succinic acid, adipic acid, sebacic acid, dimer acid, maleic acid, fumaric acid, aid the like, alicyclic dicarboxylic acid such as cyclohexanedicarboxylic acid, oxycarboxylic acid such as paraoxybenzoic acid, and the like.

In addition, examples of the dicarboxylic acid ester derivative include esters of the dicarboxylic acid compound, for example terephtalic acid dimethyl, terephtalic acid diethyl, terephtalic acid 2-hydroxyethylmethylester, 2,6-naphtalenedicarboxylic acid dimethyl, isophtalic acid dimethyl, adipic acid dimethyl, maleic acid dimethyl, dimer acid dimethyl, and the like.

Examples of the hydroxy compound include aliphatic hydroxy compound such as ethyleneglycol, 1,2-propanediol, 1,3-propanediol, 1,3-butanediol, 1,4-butanediol, 1,5-pentanediol, 1,6-hexanediol, neopentylglycol, and the like, polyoxyalkyleneglycol such diethyleneglycol, polyethyleneglycol, polypropyleneglycol, polytetramethyleneglycol, and the like, alicyclic dihydroxy compound such as 1,4-cyclohexanedimethanol, aromatic dihydroxy compound such as bisphenol A, bisphenol S, and the like.

Among them, terephtalic acid, 2,6-naphtalenedicarboxylic acid, isophtalic acid, and the like may be preferably used as dicarboxylic acid compound, and neopentylglycol, ethyleneglycol, 1,3-propanediol, 1,4-butanediol, polytetramethyleneglycol, 1,4-cyclohexanedimethanol and the like may be preferably used as dihydroxy compound.

Among them, particularly, it is preferable to use polyethylene terephtalate (PET) composed of terephtalic acid dimethyl and ethyleneglycol. More preferably, the intrinsic viscosity is preferably 0.65~0.90 in the aspect of processability and the physical property of film.

The amorphous polyester resin is the copolymer that is copolymerized polyethyleneterephtalate being prepared by polymerizing terephtalic acid (hereinafter, TPA) and ethylene glycol (hereinafter, EG), with the one component selected from the other acid component instead of terephtalic acid (TPA), the other diol component instead of ethylene glycol (EG) and mixture thereof in the 10~20 mole %, and the above-mentioned amorphous polyester resin may be added in the amount of 5~25 parts by weight based on the 100 parts by weight of polyethyleneterephtalate being contained in the masterbatch. In case that the content of amorphous resin is less than 5 parts by weight, the amorphous effect (that is, crystallization speed control effect) is low so that when drawing, the prevention of breakdown is insufficient. In case of excess of 25 parts by weight, the amorphous effect is so high, so that the intrinsic physical property of polyester film is disappeared as well as the pore formation is reduced and the opacity characteristic value of white film may be insufficient, by the promotion of the stress deterioration Examples of the acid component are selected from the group consisting of difunctional carboxylic acid such as isophtalic acid, oxyethoxy benzoic acid, adipic acid, sebacic acid, 5-sodiumsulfoisophtalic acid, End the like, the ester formation derivatives and the mixture thereof. In addition, examples of the diol component are selected from the group consisting of propyleneglycol, trimethyleneglycol, 1,4-cyclohexanediol, 1,4-cyclohexanedimethanol, 1,4-bisoxyethoxybenzene, bisphenol, polyoxyethyleneglycol, neopentylglycol and the mixture thereof.

If the copolymer contents of the each component is less than 10 mole % in the present invention, delay effect of crystallization by the amorphous is insufficient; if that is excess of 20 mole %, the reaction efficiency or reaction time at polymerization is longer, as well as the physical property or oligomer extraction amount in the final film may be increased. In the white film of the present invention, the reason, in which the certain amount of crystallization delay effect is need in the white film of the present invention, is that the crystallization speed is so high due to the addition of a great quantity of inorganic fine particles if the speed is not effectively controlled, the drawing process becomes unstable and the breakdown occur with frequency In addition, the amorphous polyester that is used for the white film of the present invention has preferably 0.60~0.80 of intrinsic viscosity. The intrinsic viscosity of the copolymer influences the kneading processability with polyester resin and the physical property of film. In case that the intrinsic viscosity is less than 0.60, the strength of the film in the processing may not be increased satisfyingly, and the breakdown at drawing occurs frequently to decrease productivity. In case of excess of 0.80, the melt viscosity is highly increased, and the productivity in the after-process may be highly decreased due to the difficulty in the unveiling process.

The barium sulfate being included in the white film of the present invention is used for satisfying the high-quality of color of film as well as increasing the whiteness, opacity (coverage), brilliance of the film, End make the pore to be formed, in which the pore consistently spreads light without absorbing the specific wavelength of light, to sufficiently bleach the film to increase the whiteness. The barium sulfate influences the whiteness, brilliance, opacity and working stability, and the like, according to its shape, the average particle size or particle size distribution and the particle distribution in the masterbatch stage.

There is no or lower than 5 vol. % of distribution of the particle of which the average particle size by Heywood's diameter of the barium sulfate is 1.0~1.5 μm and the particle size is 0.0001~0.3 μm, preferably there is no or lower than 5 vol. % of distribution of the particle of which the particle size is 3.0~10.0 μm, and more preferably 95~100 vol. % of the distribution of the particle is 0.3~3 μm.

Generally, in the distribution of the particle size in the particle group constituting the powder, the power consists of the particle having irregular shape and uneven size, and the size of this particle having irregular shape is represented by using Heywood's diameter. The term of Heywood's diameter refers to the diameter of circle having same area as the projection area of the particle.

If the average particle size by Heywood's diameter of barium sulfate is less than 1.0 μm, the dispersibility of the particle is decreased and the formation of pore is unstable by the problem, in which the aggregate is formed by the assembling of the barium sulfate fine particles, the breakdown at drawing of film occur frequently, and sufficient coverage may not be improved. In case of excess of 1.5 μm, the poor working occurs by becoming larger of the pore size as drawing to the film by large granularity, there is a concern that the glossy is largely decreased and whiteness and opacity are decreased by being increased the roughness of the film surface.

In addition, if the distribution of the particle, in which the particle size by Heywood's diameter is 0.0001~0.3 μm, is excess than 5 vol. % and the distribution of the particle, in which the particle size is 3.0~10.0 μm, is excess than 5 vol. %, i.e., the particles being out of the consistent range becomes increased, the size of particles become heterogeneous, so that the size of pore and frequency become heterogeneous at drawing into film, the breakdown of the film occur, working is poor, and the consistent physical property of final film is hardly obtained.

The distribution of particle of 0.0001~0.3 μm preferably includes all of the particle size of below than 0.3 μm, and the distribution of particle of 3.0-10.0 μm includes all of the particle size of over than 3.0 μm, but the particles in the above ranges are the most.

In addition, a distribution of particle, in which the particle size by Heywood's diameter is below than 0.3 μm, preferably include 0.001~5 vol. % of particle having more than 3.0 μm and more preferably there is no the particle that doesn't have the distribution of particle in the above range.

Meanwhile, it is preferable that the ratio of long diameter/short diameter of barium sulfite being included in the white film of the present invention is 0.7~1.0 and the refractive index is 1.6~1.7. The above range of ratio of long diameter/short diameter has preferably a shape very similar to sphere, so that it may be contributing to the forming of homogeneous and stable pore, the improvement of working and the improvement of the physical property and whiteness of the final film. In addition, if the refractive index is less than 1.6, the level of glossy is out of the desired level, and if the refractive index is excess of 1.7, the desired whiteness may be decreased by increasing the absorption of light.

Therefore, there is no the breakdown at drawing of film, and the white film having the competent whiteness, opacity and glossy may be obtained by minimizing and finely dispersing the pore size by controlling the average particle size or the distribution of particle size, shape and refractive index as above.

The white film according to the present invention may be manufactured by directly including barium sulfate together with polyester resin when extruding, but it is more preferable to apply in the form of masterbatch being contained barium sulfate into the polyester resin. On this occasion, a separate fluorescent whitening agent may be added in the optimized amount for increasing the color and whiteness.

The masterbatch may include the amount of 50 to 150 parts by weight of barium sulfate based on 100 parts by weight of polyester resin. If barium sulfate is less than 50 parts by weight, the much masterbatch are added in order to set to the desired particle content when manufacturing the film, so that the physical property is decreased and the whiteness and opacity of the film may sufficiently not be given. If excess of 150 parts by weight, the amount of polyester resin in the masterbatch is relatively decreased and at the same time the crystallization speed is so high, the chip in the course of drying is easily broken, and much of powder is generated, so that the trouble on the process may be occurred.

Meanwhile, in the manufacture of the masterbatch, the pyrolysis of polymer occurs by the process of which the rotate speed of screw is increased for the effective dispersion of the particle on the process, so that the content of oligomer is increased due to the pyrolysis, and then the decreased viscosity is compensated through the separate solid phase polymerization.

Accordingly, the melt viscosity of the final masterbatch of the present invention is preferably 500~3,000 Poise; in case of less than 500 Poise, the compensation effect of viscosity decreasing is few, and the final film is fragile, and in case of excess of 3,000 Poise, the process problems may be occurred during drying due to the easily broken resin by excessive solid phase polymerization.

Next, the stage that the polyester resin of the a) stage and masterbatch of the b) stage are mixed, and then the resulted mixture are melt-kneaded, and then extruded to prepare the sheet. On this occasion, in the procedure of melt-kneading in order to prepare the sheet, the content of partial oligomer is increased and the oligomer content of the final film is increased over than the content of raw material, the oligomer content in the polyester resin and masterbatch being used for raw material is controlled to be less than 0.5%, so that it may be manufactured such that the oligomer content in the final film is less than 0.8%.

The sheet may include in the amount of preferably 10 to 100 parts by weight, more preferably 40~70 parts by weight of the masterbatch based on the 100 parts by weight of polyester resin. If the masterbatch containing the barium sulfate is less than 10 parts by weight, the whiteness or coverage of the film may not be given; and if exceeding 100 parts by weight, it may be the cause of breakdown at drawing as well as the cost of processing of film may be increased due to the increase of the use of masterbatch.

In addition, before extruding the mixture of masterbatch and polyester resin, it is preferable to use the mixture after drying it to be 30~100 ppm of water content.

After the dried mixture is added to the extruder and melted, then extruded in the T-die, quenched with a casting drum of surface temperature of 10~50° C. and solidify, the sheet having 300~3,000 μm of thickness may be manufactured. Next, the stage of uniaxial or biaxial drawing tie manufactured sheet is proceeded.

At the drawing stage, preferably the sheet is 2~4 times drawn in the machine direction(MD), cooled to 20~35° C., warmed up at 110~140° C., and then, biaxially drawn in 3.0~4.0 times in the transverse direction(TD).

The stable film may be manufactured with giving the suitable drawing stress even at the low temperature of below than 140° C. not the existing high drawing temperature, as controlling the shape and size of barium sulfate be contained in the film of the present invention.

The drawing temperature of machine direction is preferably the temperature more than $T_g$ of polyester resin, that is 85~110° C., in case that the drawing temperature of machine direction is less than 85° C., the drawing stress is high, it has problem that the possibility of occurring breakdown at tenter drawing is high, in case of excess of 110° C., it is difficult to control the thickness. In addition, in case that the drawing ratio of machine direction is less than two times, the pore forming is short, thereby the whiteness is short as well as the thickness is poor and tie physical property is decreased, and in case of excess of four times, the crystallization by the drawing orientation is promoted, the possibility of occurring breakdown by the excessive stress at drawing stage is high.

Meanwhile, the white film of the present invention is preferably biaxially drawn in order to give consistent stability of strength, color and physical property of film. Accordingly, it is preferable to draw by warming up at 110~140° C. that is higher than drawing temperature of transversal direction, in case that the drawing temperature of transversal direction is less than 110° C., the possibility of occurring breakdown of film is high, in case of excess of 140° C., there are problems that the thickness is poor and the physical property is decreased.

Then, the heat-treatment of the drawn sheet to 180-230° C. with tenter of 5-10 pairs may be proceeded.

If the heat-treatment of the sheet is proceeded with more than 5 pairs, it is advantageous from a point of heat shrinkage being decreased when using the film, find the heat-treatment is proceeded preferably with 5~10 pairs in view of the productivity or availability of work.

In addition, after the heat-treatment, the stage of relaxing 1.01~0.0% to the length of the machine direction or transversal direction may be further included. Through the relaxing process, the stability of physical property of the film is given, and it is more preferable to relax both of machine direction and transversal direction. The relaxing of both directions has an advantage that the heat shrinkage is decreased when using the film. In case that the relaxation rate is less than 1.0%, there is no relaxing effect, and in case of excess of 10.0, the clip interval before relax-treatment is broader, so there is problem that the uneven physical property of the clip holding part and non-holding part of the film in the tenter is increased, the problems such as the wave occurring in the after-processing process may be brought because the heat shrinkage of the film is rather increased.

The white film according to the present invention has the thickness of 10~500 μm, opacity of 50 to 99%, and glossy of 40 to 80. In case that the thickness of the film is less than 10 μm, the opacity is low, and the physical property may be decreased, in case of more than 500 μm, the difficulty of manufacturing and the application of the appropriate use may be limited.

The white film may be completes by including the heat setting of the relaxed or heat-treated sheet at 200~250° C.

The white film being manufactured as set forth above has an excellent opacity and glossy, the reduced breakdown during manufacturing, and an excellent workability. In addition, the oligomer content within the final file is less than 0.8%, more concretely 0.6-0.8%, and their crystallization speed that is measured at isothermal condition of 210° C. after melting five minutes at 280° C. by using DSC, is 20 sec.~180 sec.

The white film being manufactured according to the present invention is applicable to an interior decoration, a building display, an exhibition necessity, a display, a banner or a label, and is also applicable to the advertisement necessity or lamination in the shop or facilities outside shop. Further, it may be used for various motor electric insulation that the extraction content of oligomer is low and the oligomer should not be eluted to the refrigerant, and for the back sheet of the solar cell, because the pollution by the precipitation of oligomer on surface of the film or the phenomenon of inducting dropping of adhesion may be prevented. In addition, it is suitable to apply to the various foods or the beverage packaging material.

Advantageous Effects

As mentioned above, the white film being prepared by the method of the present invention have low extract content of oligomer, doesn't have breakdown in the preparation by using the controlled of inorganics, and excellent gloss, whiteness and opacity.

In addition, there are advantages that the film having homogeneous physical property is obtained by controlling the drawing temperature, drawing ratio, heat-treatment temperature at the manufacturing process of film.

Best Mode

Hereinafter, the embodiments of the present invention is described by the examples, but the present invention is not limited the following examples.

EXAMPLE 1

1) Preparation of Polyester Pellet 50 parts by weight of ethyleneglycol based on the 100 parts by weight of terephtalic acid was added to the esterification reactor, then water was flowed out of the reactor by pressing to the pressure of 912 torr for 4 hrs at 250° C. to proceed the esterification reaction, to prepare bis(2-hydroxyethyl)terephtalate. Antimony trioxide of 300 ppm was added to this as the polymerization catalyst, the condensation polymerization was proceeded by increasing the temperature from 250° C. to 285° C. at 60° C./hr, and reducing the pressure to 0.5 torr. During the condensation polymerization reaction, thirty minutes before the stirring toke reaching point, 2,2-bisoxazolin that is end-capping agent was added in (0.05% by weight, then the reaction system was filled with nitrogen at the point of reaching to the desired stirring torque to restore to the normal pressure, the condensation polymerization was completed, it was discharged in the form of strand into cold water, then immediately cut to obtain PET pellet.

The solid phase polymerization process as set forth below was carried out with the manufactured PET pellet. At the stage of starting solid phase polymerization, the reduced pressure is carried out to keep 0.7 torr, this pressure was kept until the solid phase polymerization is finished. In order to remove the sufficient water from room temperature to 100° C., the heat-up and temperature was kept for 6 hrs, then the heat-up was carried out to 235° C. for 6 hours for crystallization. After reaching to 235° C., in order to evaluate the extent of removing of oligomer achieved, the temperature was kept for 8 hrs. The intrinsic viscosity of the manufactured polyethyleneterephtalate resin was 0.8 dl/g, and oligomer content was 0.4%.

2) Preparation of Masterbatch 5 parts by weight of amorphous polyester resin that isophtalic acid(IPA) of 15 mole % was copolymerized, was added to the polymerization reaction of terephtalic acid(TPA) and ethyleneglycol(EG), based on 100 parts by weight of polyethyleneterephtalate resin having the intrinsic viscosity of 0.65 dl/g, 100 parts by weight of barium sulfate that the average diameter by Heywood's diameter is 1.0 μm, the distribution having the particle size of 0.0001~0.3 μm is 3 vol. %, the distribution having the particle size of 3.0~10.0 μm is 2 vol. %, the ratio of long diameter/short diameter is 0.9, the refractive index is 1.64 and the 150 ppm of fluorescent whitening agent powder for improving the whiteness were quantitatively added to the twinscrew extruder hopper, to prepare the compounding chip. By solid phase polymerization of chip, the masterbatch having the melt viscosity of 1,500~2,300 Poise (Shear Rate 100~5,000 l/s full range after melting for 5 min. at 280° C.) and 0.4% of oligomer content was prepared.

3) Preparation of White Film 35 parts of weight of masterbatch being prepared in 2), based on 100 parts by weight of polyethyleneterephtalate chip having the intrinsic viscosity of 0.8 dl/g and 0.4% of oligomer content, being prepared in 1) was mixed, put to the extruder, melted, then extruded at T-die, to prepare the sheet having the surface temperature of 30° C.

The prepared polyethyleneterephtalate sheet was drawn three times in the machine direction(MD) at 105° C., and cooled down, then drawn more 3.5 times in the transversal direction(TD) by warming up at 130° C. higher than machine direction(MD) drawing temperature, the heat-treatment was carried out at 220° C. in the heat-treatment zone of tenter of more than 5 pairs, then the film was 5% relaxed to the length of transversal direction at the temperature of 2.0° C., and cooled down to prepare the biaxially drawn white film having the thickness of 188 μm.

The physical property of the prepared white film was measured and represented in the following Table 1.

EXAMPLES 2-5

Except using after preparing the masterbatch having the same physical property as following Table 1, the white film was prepared by the same method as Example 1. The physical property of the prepared white film was measured and represented in the following Table 1.

COMPARATIVE EXAMPLE 1

1) Preparation of Masterbatch

Except not using the amorphous polyester resin when preparing masterbatch, the masterbatch having the melt viscosity of 2,300~3,000 Poise (Shear Rate 100~5,000 l/s full range after melting for 5 min. at 280° C.) and 0.38% of oligomer content was prepared by the same method as Example 1. The physical property of the prepared white film was measured and represented in the following Table 1.

2) Preparation of Polyester Pellet and White Film

Except using after preparing the masterbatch being prepared in 1), the white film was prepared by the same method as Example 1.

COMPARATIVE EXAMPLES 2-7

When preparing the masterbatch, separate solid phase polymerization process was not went through, except using after preparing the masterbatch having the same physical property as following Table 1, the white film was prepared by the same method as Example 1. But, the separate solid phase polymerization of polyester resin was not proceeded in the condition of intrinsic viscosity of 0.64 after polymerizing. The physical property of the prepared white film was measured and represented in the following Table 1.

The following physical property of the white film was measured with the following measuring method.

1) Intrinsic Viscosity (I.V)

To 100 ml reagent being mixed in the weight ratio of 6:4 of phenol and 1,1,2,2-tetrachloro ethanol, 0.4 g of chip in the shape of pellet was added, dissoluted for 90 min., then moved to the Ubbelohde viscometer, kept for 10 min. at 30° C. constant temp water bath, and the dropping second number of the solution was measured by using the viscometer and aspirator. After measuring the dropping second number of the solvent with the same method, R.V.value and I.V.value were calculated by the following Equations 1 and 2. In the following Equation 1, C represents the concentration of the sample.

$$R.V.=\text{dropping second number of sample/dropping second number of solvent} \quad \text{[Equation 1]}$$

$$I.V.=1/4(R.V.-1)/C+3/4(\ln R.V./C) \quad \text{[Equation 2]}$$

2) Melt Viscosity (M.V)

After drying the masterbatch at 110° C. for 4 hrs by using RHEO TESTER 2000 made by GOTTFERT Co., the fixed amount was added to the Barrel of Capillary Rheometer, and premelted at 280° C. for 5 min., and then the melt viscosity was measured from the pressure being applied to the capillary tube in the full range of Shear Rate 100~5,000 l/s.

3) Content of Oligomer

After 0.1 g of PET film (sample) was dissolved in 10 ml mixture being mixed in the 1:1 ratio by weight of 1,1,1,3,3,3-hexafluoro-2-propanol/chloroform, the sample was prepared. The polymer and oligomer on the sample were separated, the separated oligomer was quantified using High Performance Liquid Chromatography (HPLC), to represent in % by weight based on the initial amount of sample.

4) Measurement of Average Particle Size by Heywood's Diameter and Particle Size Distribution The average particle size and particle size distribution of the particle being dispersed in the ethyleneglycol were measured by using Laser Diffraction Particle Size Analyzer (LS 13320) made by Beckman Co.

5) Measurement of Long Diameter/Short Diameter

The long diameter and short diameter of the particle were measured in the unit of 0.1 μm, through the scale ruler by taking a picture of particle by using Scanning Electron Microscopy(SEM).

6) Measurement of Breakdown

During the drawing or heat-treatment of the prepared film, the condition where the film is destroyed in the process section, thus normal operation is impossible was seen with the naked eye.

7) Measurement of Opacity

It was measured by using Film Opacity Meter Series 6000 equipment. The Opacity when turning off the light without loading of sample was compensated to 100%, the Opacity when turning on the light was compensated to 0%.

8) Measurement of Isothermal Crystallization Speed Differential Scanning Calorimetry (DSC)

The crystallization peak was measured by using differential scanning calorimetry (Perkin Elmer Co. DSC 7) with keeping the temperature after rapidly cooling to 210° C., after heating to 280° C. in the heating speed of 20° C./min and leaving for 5 min. The time reaching to peak was measured as the crystallization speed.

(In the above Table, M/B is masterbatch, PET is polyethyleneterephthalate, IPA is isophtalic acid, NPG is neopentylglycol.)

As seen in the result of above Table 1, in the case of Examples 1~5, it may be confirmed that the white film being satisfied in the physical property aspect without breakdown, and having good processability. In case of Comparative Example 1, the amount of extraction of oligomer is good, however the breakdown occurrence by the crystallization at drawing was frequently occurred because there is no delay effect of the crystalline property by not applying amorphous polyester resin when preparing masterbatch. In addition, in case of Comparative Examples 2 to 3, the workability was poor by the occurrence of breakdown out of the suitable content level of amorphous polyester resin, or the extraction content of oligomer was high due to the low viscosity of the raw material chip.

In case of Comparative Examples 4 to 5, there are problems that the workability was poor by the occurrence of breakdown out of the suitable level of blending ratio content of amorphous polyester resin when preparing masterbatch, or the chip brokenness and power generation during drying transportation process of masterbatch chip under the influence of low crystallization delay, the extraction content of oligomer was high due to the low viscosity of the raw material chip.

In case of Comparative Examples 6 to 7, there is the problem that the opacity was short due to the shortage of suitable pore forming by influencing the drawing stress, and the extraction content of oligomer was high.

TABLE 1

| | Raw material chip and drawing condition | | | | | | | Physical property of final film | | | | |
|---|---|---|---|---|---|---|---|---|---|---|---|---|
| | Amorphous Polyester | | | | | | | | Oligomer content | | | |
| Division Unit | Copolymer Component/ content mol % | Blending ratio parts by weight | M/B adding parts by weight | M/B M.V (100~5,000 l/s @280° C.) Poise | M/B Oligomer Content wt % | PET I.V dl/g | Drawing ratio MD/TD times | Isothermal Crystallization speed second | in the final film wt % | breakdown — | opacity % | problem — |
| Example 1 | IPA/15 | 5 | 35 | 1,500~2,300 | 0.4 | 0.80 | 3.0/3.5 | 97 | 0.72 | None | 87 | good |
| Example 2 | IPA/15 | 15 | 30 | 2,000~2,700 | 0.4 | 0.68 | 3.0/3.5 | 148 | 0.76 | None | 85 | good |
| Example 3 | IPA/8 | 20 | 40 | 2,200~2,800 | 0.4 | 0.84 | 3.0/3.5 | 174 | 0.75 | None | 84 | good |
| Example 4 | NPG/18 | 5 | 35 | 1,000~1,800 | 0.4 | 0.85 | 3.0/3.5 | 78 | 0.68 | None | 86 | good |
| Example 5 | NPG/12 | 20 | 40 | 500~1,300 | 0.4 | 0.90 | 3.0/3.5 | 28 | 0.70 | None | 83 | good |
| Comparative Example 1 | None | — | 35 | 2,300~3,000 | 0.38 | 0.90 | 3.0/3.5 | 64 | 0.69 | Occur | 78 | Work ability poor |
| Comparative Example 2 | IPA/8 | 20 | 35 | 700~1,200 | 1.72 | 0.64 | 3.0/3.5 | 25 | 1.75 | Occur | 79 | Work ability poor |
| Comparative Example 3 | IPA/25 | 10 | 35 | 300~800 | 1.78 | 0.64 | 3.0/3.5 | 29 | 1.95 | None | 81 | Oligomer over extraction |
| Comparative Example 4 | NPG/18 | 3 | 35 | 400~800 | 1.73 | 0.64 | 3.0/3.5 | 23 | 1.76 | Occur | 77 | Work ability poor |
| Comparative Example 5 | NPG/18 | 25 | 35 | 300~600 | 1.69 | 0.64 | 3.0/3.5 | 34 | 1.78 | None | 79 | Oligomer over extraction |
| Comparative Example 6 | NPG/18 | 15 | 25 | 300~700 | 1.72 | 0.64 | 3.0/3.5 | 25 | 1.78 | None | 80 | Oligomer over extraction |
| Comparative Example 7 | NPG/18 | 45 | 45 | 400~900 | 1.73 | 0.64 | 3.0/3.5 | 32 | 1.97 | None | 78 | Opacity shortage, Oligomer over extraction |

The invention claimed is:

1. A method for manufacturing white plastic film comprising:
- providing a first particulate polyester material and second particulate polyester material;
- subjecting said first particulate polyester material to solid state polymerization to prepare a first polyester resin having the intrinsic viscosity of 0.65~0.90 and the oligomer content of less than 0.5%;
- providing a master batch composition comprising the second particulate polyester material −5[~]-25 parts by weight of an amorphous polyester resin and 50[~]150 parts by weight of barium sulfate, each based on 100 parts by weight of the second particulate polyester material;
- subjecting the master batch composition to solid state polymerization to prepare a second polyester resin having an oligomer content of less than 0.5% within the second polyester resin, and a melt viscosity of 500[~]-3,000 Poise in the full range of shear rate 100[~]-5,000 l/s after melting at 280° C. for 5 minutes;
- preparing a mixture of the first polyester resin and the second polyester resin,
- subjecting the mixture to melt-extrusion to prepare a sheet;
- drawing the sheet to produce a film;
- heat-treating the drawn film; and
- heat-setting the heat-treated film to provide the white plastic film, wherein, the white plastic film has an oligomer content of less than 0.8% in the final film, and a crystallization speed of 20~180 seconds when measured under the isothermal condition of 210° C. after melting at 280° C. for 5 minutes by using differential scanning calorimetry.

2. The method of claim 1, wherein the amorphous polyester resin is a copolymer of terephtalic acid, ethyleneglycol, and at least one of an additional acid component and an additional diol component, wherein the total amount of the additional acid component and the additional diol component is 10-20 mol %, wherein the additional acid component is selected from the group consisting of isophtalic acid, oxyethoxy benzoic acid, adipic acid, sebacic acid, 5-sodiumsulfoisophtalic acid, the ester-forming derivative thereof, and a mixture thereof; and the additional diol component is selected from the group consisting of propyleneglycol, trimethyleneglycol, 1,4-cyclohexandiol, 1,4-cyclohexanedimethanol, 1,4-bix-oxyethoxybenzene, bisphenol, polyoxyethyleneglycol, neopentylglycl, and a mixture thereof.

3. The method of claim 2, wherein the amount of barium sulfate in the master batch composition is 50[~]-150 parts by weight based on the 100 parts by weight of the amorphous polyester resin.

4. The method of claim 3, wherein the sheet comprises 10[~]-100 parts by weight of the second polyester resin based on the 100 parts by weight of the first polyester resin.

5. The method of claim 4, wherein the first polyester resin is polyethyleneterephtalate.

6. A white plastic film prepared by the method of claim 1.

7. A white plastic film prepared by the method of claim 2.

8. A white plastic film prepared by the method of claim 3.

9. A white plastic film prepared by the method of claim 4.

10. A white plastic film prepared by the method of claim 5.

* * * * *